United States Patent
Kamiya

(10) Patent No.: US 12,175,146 B2
(45) Date of Patent: Dec. 24, 2024

(54) IMAGE FORMING APPARATUS FOR SWITCHING A MENU CORRESPONDING TO A REGISTERED TERMINAL

(71) Applicant: CANON KABUSHIKI KAISHA, Tokyo (JP)

(72) Inventor: Yuka Kamiya, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 18/529,553

(22) Filed: Dec. 5, 2023

(65) Prior Publication Data

US 2024/0184495 A1 Jun. 6, 2024

(30) Foreign Application Priority Data

Dec. 6, 2022 (JP) .................... 2022-194685

(51) Int. Cl.
*G06F 3/12* (2006.01)
(52) U.S. Cl.
CPC .......... *G06F 3/1258* (2013.01); *G06F 3/1205* (2013.01); *G06F 3/1292* (2013.01)
(58) Field of Classification Search
CPC .......... H04N 1/00509; H04N 1/00511; H04N 1/00514; H04N 1/00517; G06F 3/1258; G06F 3/1204; G06F 3/1292
See application file for complete search history.

(56) References Cited

U.S. PATENT DOCUMENTS

| | | | | |
|---|---|---|---|---|
| 2008/0244397 | A1* | 10/2008 | Ferlitsch | H04N 1/00498 715/703 |
| 2011/0219301 | A1* | 9/2011 | Tomono | H04N 1/00514 715/274 |
| 2014/0126018 | A1* | 5/2014 | Sugimoto | H04N 1/00251 358/1.15 |
| 2016/0231969 | A1* | 8/2016 | Kashiwagi | G06F 3/126 |
| 2020/0068080 | A1* | 2/2020 | Kawabata | H04N 1/00514 |
| 2020/0364005 | A1* | 11/2020 | Takenaka | G06F 3/1205 |
| 2021/0019094 | A1* | 1/2021 | Ohnishi | G06F 3/1257 |

FOREIGN PATENT DOCUMENTS

JP 2009009382 A 1/2009

* cited by examiner

*Primary Examiner* — Benjamin O Dulaney
(74) *Attorney, Agent, or Firm* — Canon U.S.A., Inc. IP Division

(57) ABSTRACT

The image forming apparatus is capable of switching settings according to a usage scene, and includes a control unit that, when a job is received from a terminal device, controls switching to the setting corresponding to the usage scene registered in association with information of the terminal device.

11 Claims, 11 Drawing Sheets

IMAGE FORMING APPARATUS FOR SWITCHING A MENU CORRESPONDING TO A REGISTERED TERMINAL

BACKGROUND

Field of the Disclosure

The present disclosure relates to an image forming apparatus, a control method of the image forming apparatus, and a non-transitory computer readable storage medium.

Description of the Related Art

With the widespread use of home works, remote lectures, and the like, there are increasing cases in which image forming apparatuses in households are used in work and learning. In a home work or a remote lecture, it is conceivable to use a dedicated terminal device supplied from a company or a school. When a home image forming apparatus is shared from these dedicated terminal devices, it is desirable to use the image forming apparatus in a main body setting suitable for each application. For example, in the case of using in work, it may be desired to use in settings frequently used in work scene.

In such a case, a user switches the scene from an operation panel of the image forming apparatus to switch the main body setting.

Japanese Patent Application Laid-Open No. 2009-009382 discloses, as a technology for changing a display of an image forming apparatus from an external terminal device, a technology for transmitting a menu item change command transmitted from the external terminal device to the image forming apparatus to set a menu item designated by the command to a requested state (for example, a display state or a non-display state).

However, switching the scene from the operation panel of the image forming apparatus is inconvenient when using the image forming apparatus from the terminal device. Further, as described in Japanese Patent Application Laid-Open No. 2009-009382, an operation instructed by the user from the external terminal device is also complicated, and there is a possibility that convenience of the user is reduced.

SUMMARY

Embodiments of the present disclosure have been made to solve the above issues. Embodiments of the present disclosure provide a mechanism for improving convenience when using an image forming apparatus from an external terminal device.

According to embodiments of the present disclosure, there is provided an image forming apparatus capable of switching settings based on a usage scene, the image forming apparatus including: control unit configured to control switching a setting corresponding to a usage scene registered in association with the information of the terminal device when a job is received from the terminal device.

Further features of the present disclosure will become apparent from the following description of exemplary embodiments with reference to the attached drawings.

DESCRIPTION OF THE EMBODIMENTS

First Embodiment

Figure 1:
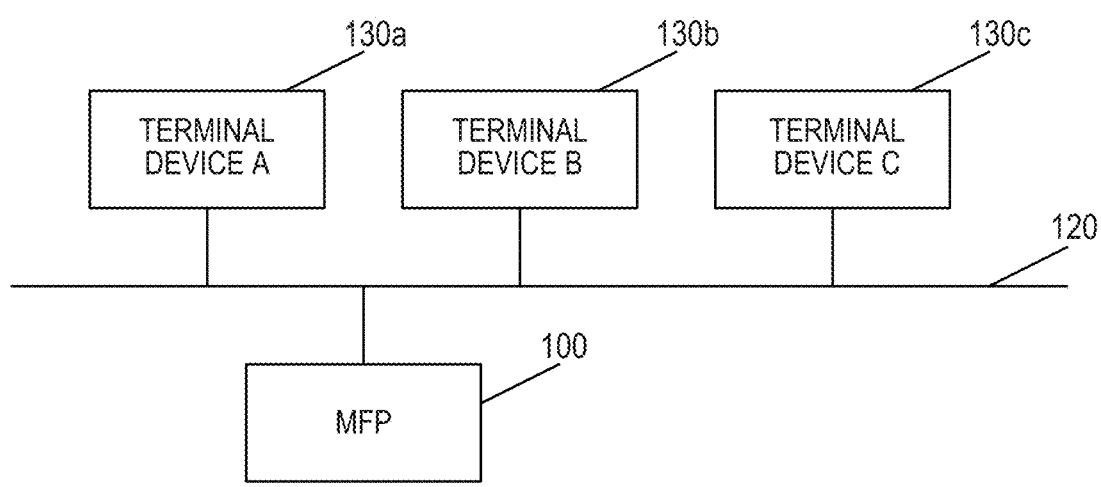
FIG. 1 is a diagram showing a system configuration example of the present embodiment.

Embodiments of the present disclosure will now be described in detail with reference to the accompanying drawings. The following embodiments do not limit the present disclosure according to the claims, and all combinations of features described in the embodiments are not necessarily essential to means for solving the present disclosure. In the accompanying drawings, the same or similar components are denoted by the same reference numerals, and redundant explanations thereof are omitted.

<System Configuration>

FIG. 1 is a diagram showing an example of a configuration of a system according to an embodiment of the present disclosure.

MFP 100 is connected to one or more terminal devices A, B and C (Terminal A (130a), terminal B (130b) and terminal C (130c)) via a network 120.

The network 120 is a line for connecting each device to each other, and is a network based on a known technology. Although the network 120 is mainly assumed to be a home LAN (Local Area Network) in the present embodiment, the network 120 is not particularly limited to a connection mode, and is not limited to a wired/wireless network.

The MFP (Multifunction Peripheral) 100 is an image forming apparatus having a copying function, a scanning function, a printing function, and the like. Various jobs are executed in response to requests from the terminal devices A, B and C. The image forming apparatus used in the present embodiment may be an electrophotographic system, an ink jet system, or another system.

Although a personal computer (PC), a tablet terminal, a smartphone, or the like is assumed as the terminal devices A, B and C, the type of the terminal devices is not limited as long as the terminal devices A, B and C can communicate with the MFP 100 and request jobs.

<Body Block Diagram>

Figure 2:
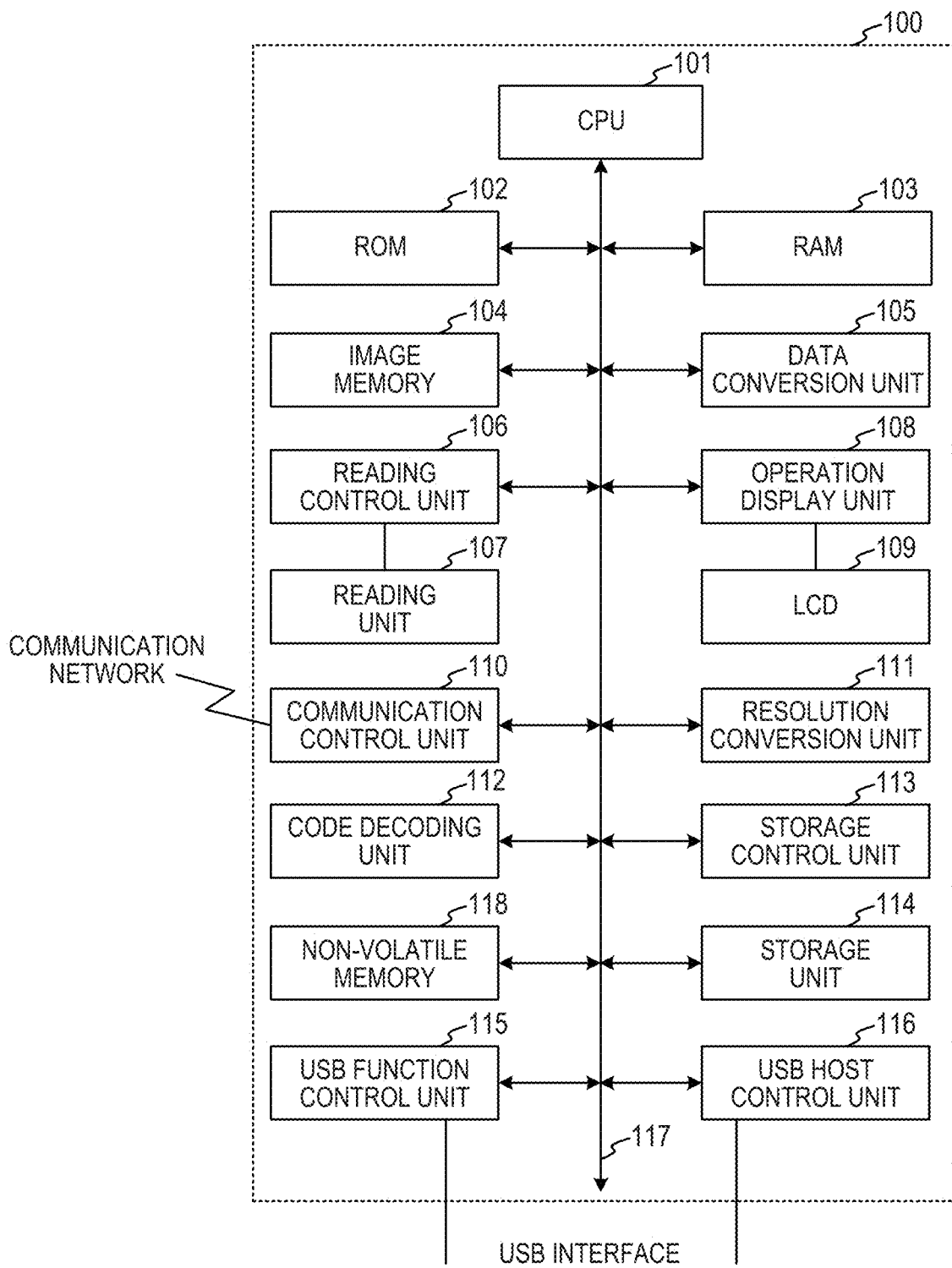
FIG. 2 is a block diagram showing a schematic configuration example of an MFP according to the embodiment.

FIG. 2 is a block diagram showing an example of a schematic configuration of the MFP 100.

The MFP 100 is a kind of information processing apparatus. The MFP 100 is a kind of electronic apparatus. The MFP 100 of the present embodiment includes information processing functions such as generation, storage, and transmission of device information including log information and status information. The MFP 100 of the present embodiment includes an image forming function of forming an image on a storage medium by a storage control unit 113 and a storage unit 114, which will be described later.

The MFP 100 includes a CPU 101, a ROM 102, a RAM 103, an image memory 104, a data conversion unit 105, a reading control unit 106, a reading unit 107, an operation display unit 108, an LCD 109, a communication control unit 110, and a resolution conversion unit 111. Further, the MFP 100 includes a code decoding unit 112, the storage control unit 113, the storage unit 114, a USB function control unit 115, a USB host control unit 116, a bus 117, and a non-volatile memory 118.

The CPU 101 is a system control unit and reads out and executes a program stored in the ROM 102 or the like to control the entire MFP 100.

The ROM 102 is a non-volatile memory that stores fixed data such as a control program executed by the CPU 101, a data table, and an embedded operating system (OS).

In the present embodiment, each control program stored in the ROM 102 performs software execution control such as scheduling, task switch, and interrupt processing under the control of the embedded OS stored in the ROM 102. The ROM 102 stores information indicating a license state indicating whether to provide device information to the outside.

The RAM 103 is configured to include SRAM (Static Random Access Memory) or the like that requires a backup power source. Power supply to the RAM 103 is ensured by a primary battery (not shown) for data backup. The RAM 103 stores program control variables and the like.

The image memory 104 is configured to include DRAM (Dynamic Random Access Memory) or the like, and can store image data. A part of the area of the image memory 104 is secured as a work area for executing software processing.

The data conversion unit 105 can perform conversion of image data such as analysis of a page description language (PDL) and expansion of CG (Computer Graphics) of character data.

The reading unit 107 optically reads a document by a CIS image sensor and converts the document into an electrical image signal.

The reading control unit 106 performs various kinds of image processing such as binarization processing and halftone processing on the image signal converted by the reading unit 107, and outputs high-definition image data. The method of optically reading the document may be either a sheet reading control method of reading the document using a fixed CIS image sensor or a book reading control method of reading the document using a moving CIS image sensor.

The operation display unit 108 includes minimum necessary keys such as numerical value input keys, mode setting keys, decision keys, and cancel keys, a touch detection unit (configures a touch panel display together with the LCD 109), an LED (light emitting diode), and a segment display unit. Some or all of the various keys described above are realized by so-called soft keys displayed on the LCD 109, and can accept operations from a user. The operation display unit 108 and the LCD 109 configure an operation panel. When the user's operation is not performed on the operation display unit 108 for a certain period of time, the LCD 109 turns off the backlight of the LCD 109 in order to reduce power consumption.

The communication control unit 110 controls communication between the MFP 100 and a communication network (the network 120 in the example of FIG. 1) to enable connection to an Internet service provider and communication of various data between the MFP 100 and a service management server (not shown). The communication control unit 110 can determine whether the MFP 100 is connected to the Internet or only to the LAN. The communication control unit 110 and the communication network are connected by a well-known method such as HTTP or XMPP.

The resolution conversion unit 111 performs resolution conversion processing such as mutual conversion between millimeter-based image data and inch-based image data. The resolution conversion unit 111 can also execute enlargement/reduction processing of image data.

The code decoding unit 112 performs code decoding processing and enlargement/reduction processing on image data (uncompressed, MH, MR, MMR, JBIG, JPEG, etc.) handled by the MFP 100.

The storage control unit 113 converts the image data to be printed into high-definition image data by performing various kinds of image processing such as smoothing processing, recording density correction processing, and color correction, and outputs the image data to the storage unit 114. The storage control unit 113 also serves to periodically acquire the state information data of the storage unit 114.

The storage unit 114 is configured by a laser beam printer, an ink jet printer, or the like, and prints the image data generated by the storage control unit 113 on a storage medium such as paper.

The USB function control unit 115 performs protocol control according to the USB communication standard.

The USB host control unit 116 is a control unit for performing communication according to a protocol defined by the USB communication standard. This USB communication standard is a standard for bidirectional high-speed data communication, and according to this USB communication standard, it is determined that a plurality of hubs or functions (slaves) can be connected to one host (master). That is, the USB host control unit 116 provides a host function in USB communication.

The non-volatile memory 118 is a non-volatile memory for storing data acquired from a network, settings of an information processing apparatus, and the like.

Among the above-described components, components other than the reading unit 107 and the LCD 109 are connected to each other via the bus 117.

<Terminal Device Block Diagram>

Figure 3:
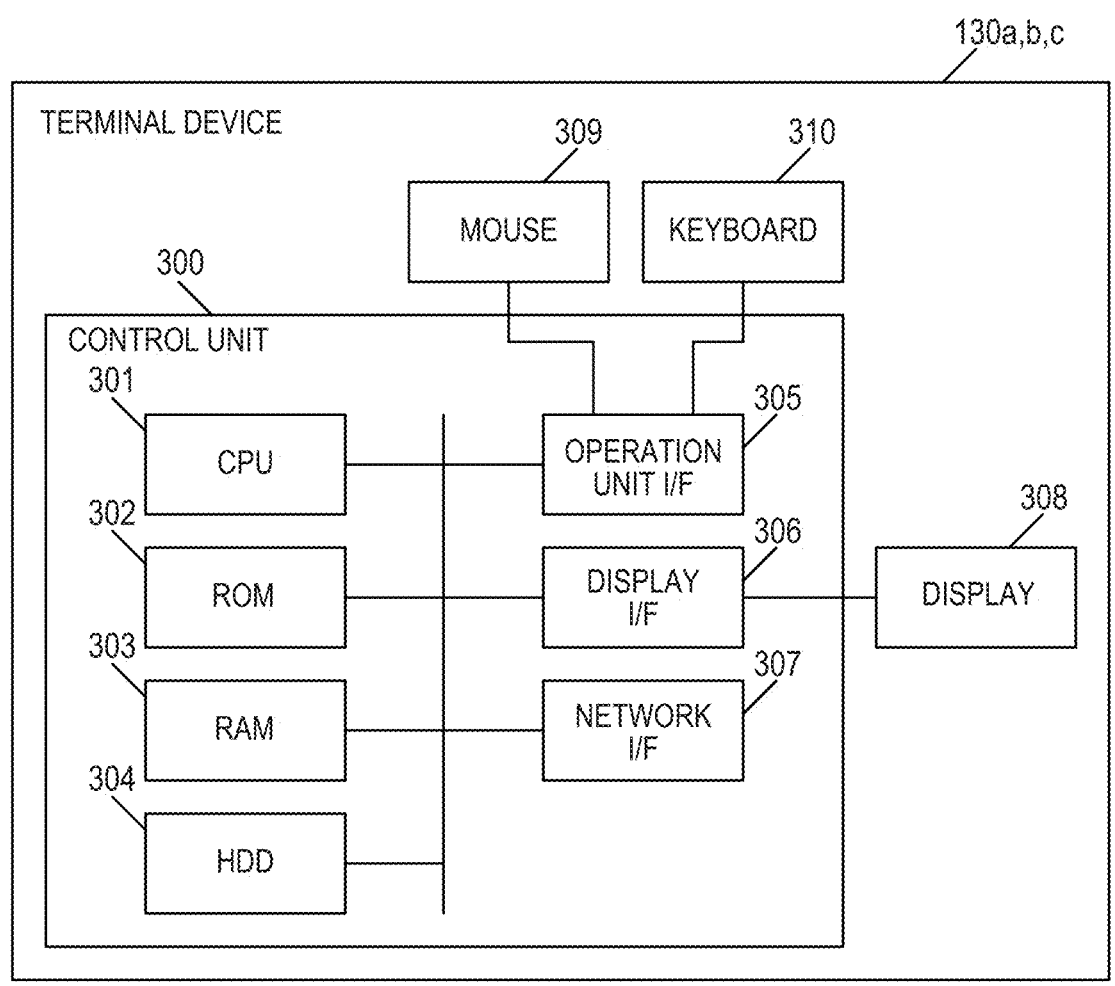
FIG. 3 is a block diagram showing a schematic configuration example of a terminal device according to the embodiment.

FIG. 3 is a block diagram showing an example of the configuration of each of the terminal device A (130a), the terminal device B (130b), and the terminal device C (130c).

A control unit 300 including a CPU 301 controls the overall operation of the terminal device 130.

The CPU 301 reads out a control program stored in a ROM 302 and executes various control processes.

A RAM 303 is used as a temporary storage area such as a main memory and a work area of the CPU 301.

An HDD 304 stores image data and various programs. Note that another storage device such as an SSD (Solid State Drive) may be provided instead of or in combination with an HDD (Hard Disk Drive).

operation unit I/F 305 is an interface for connecting a user interface terminal for inputting a control operation to a program executed by the terminal device 130. In the present embodiment, the operation unit I/F 305 includes a mouse 309 and a keyboard 310.

A display I/F 306 is an interface for connecting a display terminal that displays a UI of a program executed by the terminal device 130. In the present embodiment, the display terminal includes a display 308, but the present disclosure is not limited thereto.

For example, a display with a touch panel or the like may be connected to the operation unit I/F 305 and the display I/F 306.

A network I/F 307 connects the control unit 300 to a communication network (the network 120 in the example of FIG. 1). The network I/F 307 performs various types of communication with the MFP 100 via a network.

<Operation Panel>

Figure 4:
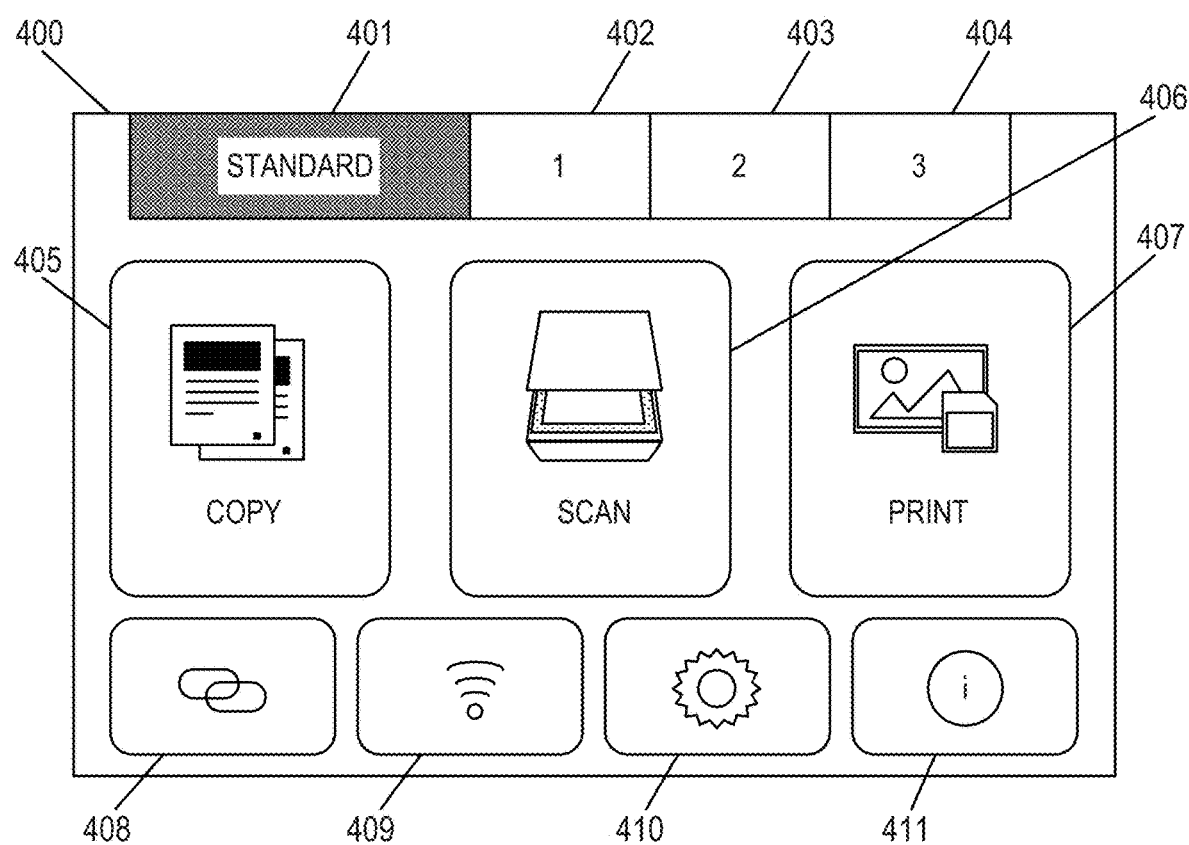
FIG. 4 is a diagram showing an example of a standard home screen displayed on an operation panel.

FIG. 4 is a diagram showing an example of a standard home screen displayed on an operation panel. The operation display unit 108 according to the present embodiment displays a tab-format screen as an operation screen on the LCD 109.

A standard tab 401 is a tab corresponding to the standard home screen. A tab 1 (402), a tab 2 (403), and a tab 3 (404) are tabs corresponding to a custom home screen.

The user can switch the home screen by pressing (touching) these tabs. Changing the color of the selected tab from the color of the other tab indicates that the tab is selected. For example, when the standard tab 401 is selected, the color of the standard tab 401 is changed to the color of the other tabs to indicate that the standard tab is selected and the standard home screen is displayed.

A copy menu button 405, a scan menu button 406, a print menu button 407, a LAN button 408, a wireless connection button 409, a setting button 410, and a hint button 411 are buttons corresponding to the respective menus. By pressing these buttons, the user transitions to the corresponding menus.

Figure 5A:
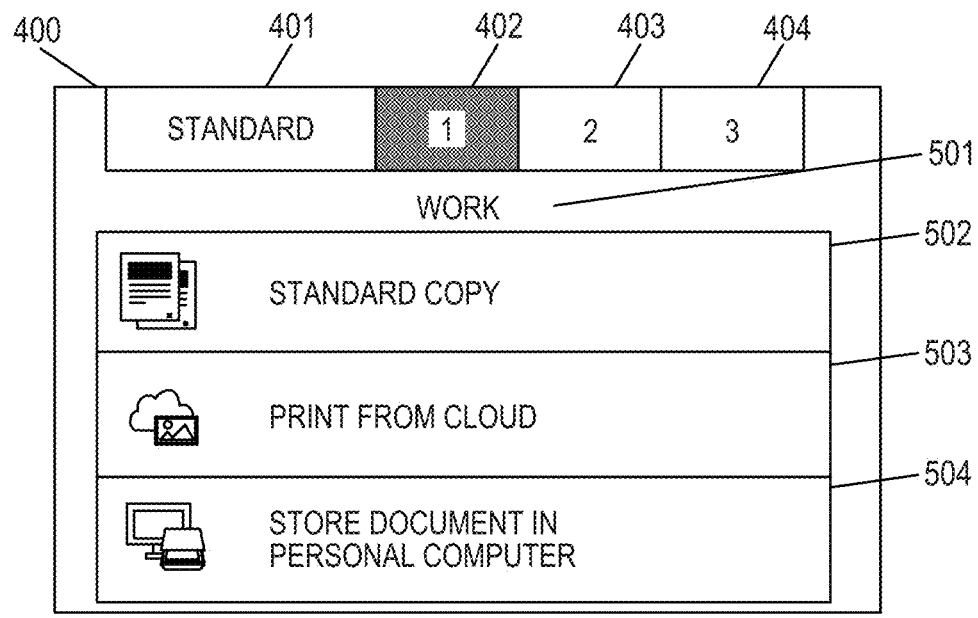
FIG. 5A is a diagram showing an example of a custom home screen displayed on the operation panel.
Figure 5B:
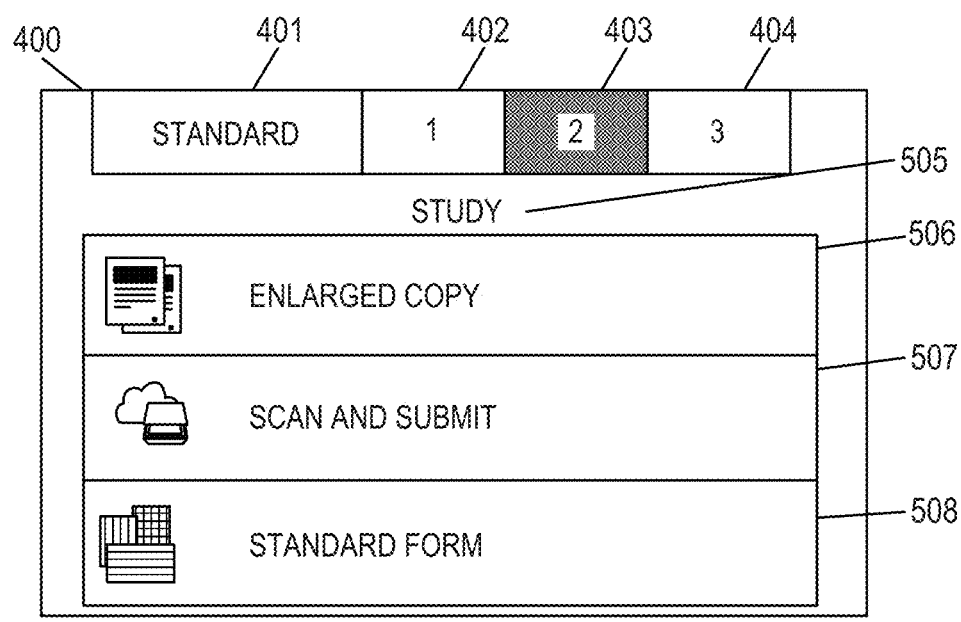
FIG. 5B is a diagram showing an example of a custom home screen displayed on the operation panel.
Figure 5C:
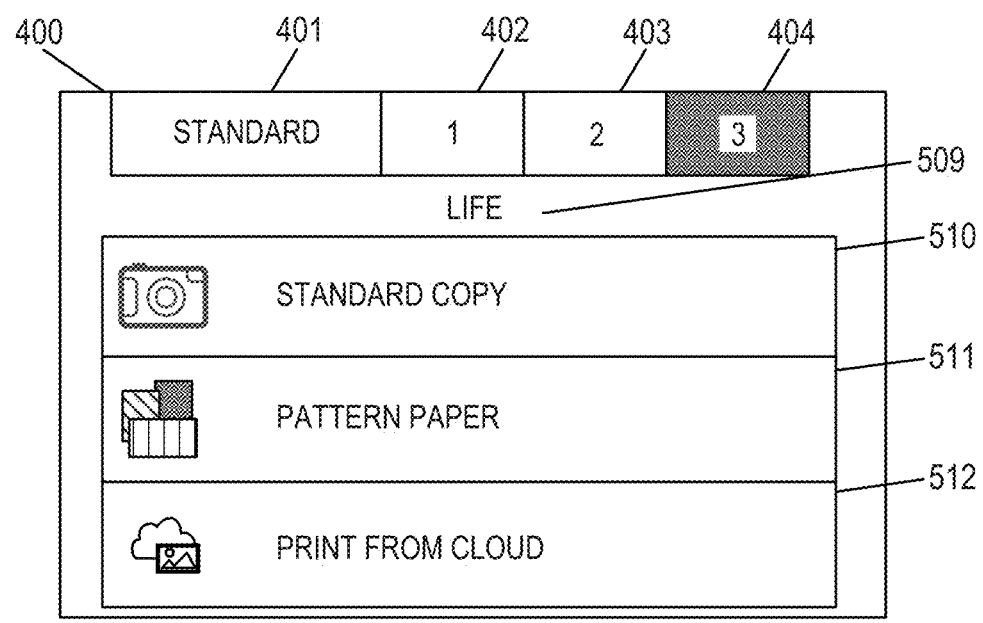
FIG. 5C is a diagram showing an example of a custom home screen displayed on the operation panel.

FIGS. 5A, 5B, and 5C are diagrams showing the custom home screens of the tab 1, the tab 2, and the tab 3 displayed on the operation panel.

FIGS. 5A, 5B, and 5C show that the custom home screens of the tab 1 (402), the tab 2 (403), and the tab 3 (404) are displayed by changing the colors of the tabs of the tab 1 (402), the tab 2 (403), and the tab 3 (404) to the other tabs.

Reference numerals 502, 503 and 504 in FIG. 5A, reference numerals 506, 507 and 508 in FIG. 5B, and reference numerals 510, 511 and 512 in FIG. 5C are custom menus, respectively. The custom menu corresponds to a menu that can be customized by the user, and can specify a function to be displayed at each menu position.

For the tab 1 (402), the tab 2 (403), and the tab 3 (404), respectively, menus can be categorized depending on the particular scene or depending on the user.

For example, a menu of "work scenes" is categorized in the tab 1 (402), and "WORK" is displayed as a title 501 indicating the work scenes.

Further, a menu of "learning scenes" is categorized in the tab 2 (403), and "STUDY" is displayed as a title 505 indicating the learning scenes.

The tab 3 (404) categorizes a menu of "live scenes", and "LIFE" is displayed as a title 509 indicating the live scenes.

In this way, the operation panel can display a home screen in which menus with high use frequency are arranged for each scene.

FIG. 5A shows an example of the custom home screen in which menus often used in work scenes are arranged on a home screen.

FIG. 5A shows a state in which the tab 1 (402) is selected, and the custom home screen for a work scene is displayed in the tab 1 (402).

The custom menu 502 is a "standard copy" menu, the custom menu 503 is a "print from cloud" menu, and the custom menu 504 is a "storing a document in a personal computer" menu. On the custom home screen, menus often used in work scenes are arranged.

FIG. 5B shows an example of the custom home screen in which menus often used in learning scenes are arranged on a home screen.

FIG. 5B shows a state in which the tab 2 (403) is selected, and the custom home screen for a learning scene is displayed in the tab 2 (403).

The custom menu 506 is an "enlarged copy" menu, the custom menu 507 is a "scanned submission" menu, and the custom menu 508 is a "standard form" menu. On the custom home screen, menus often used in learning scenes are arranged.

FIG. 5C shows an example of the custom home screen in which menus often used in live scenes are arranged on a home screen.

FIG. 5C shows a state in which the tab 3 (404) is selected, and the tab 3 (404) displays the custom home screen for a live scene.

The custom menu 510 is a "photo print" menu, the custom menu 511 is a "pattern paper" menu, and the custom menu 512 is a "print from cloud" menu. On the custom home screen, menus often used in live scenes are arranged.

Here, an example of body setting for each scene to be used is shown in a body setting table in Table 1.

TABLE 1

BODY SETTING TABLE

| Setting item | Standard | Work Scene | Learning Scene | Life Scene |
| --- | --- | --- | --- | --- |
| Duplex Print Setting | invalid | valid | invalid | valid |
| Quiet Sound Setting | invalid | valid | valid | invalid |
| Image Quality | standard | standard | high quality | high quality |
| Sheet Mismatch Detection | invalid | valid | invalid | invalid |

The user can set each setting item for each scene to be used.

In the example of the main body setting table shown in the Table 1, the duplex print setting is valid only in the work scene. This setting item corresponds to a user's need in a case where it is desired to suppress consumption of paper with respect to printed matter in work.

The quiet sound setting is a setting for suppressing the operation sound of the MFP, and is effective in a work scene and a learning scene because the quiet sound setting is concentrated on work.

As the image quality setting, high image quality setting is performed in learning scenes and life scenes in which illustrations, photographs, and the like are often printed.

The sheet mismatch detection is for setting whether or not to display a message when the sheet setting by the printer driver is different from the sheet information of the cassette registered in the MFP at the time of printing from the terminal device. This setting item is effective only in a work scene in which misprint is desired to be reduced as much as possible.

It should be noted that the main body setting for each usage scene is an example, and the present disclosure is not limited thereto. It is assumed that the main body settings for each usage scene are stored in the non-volatile memory 118 of the MFP 100 shown in FIG. 2.

Figure 6A:
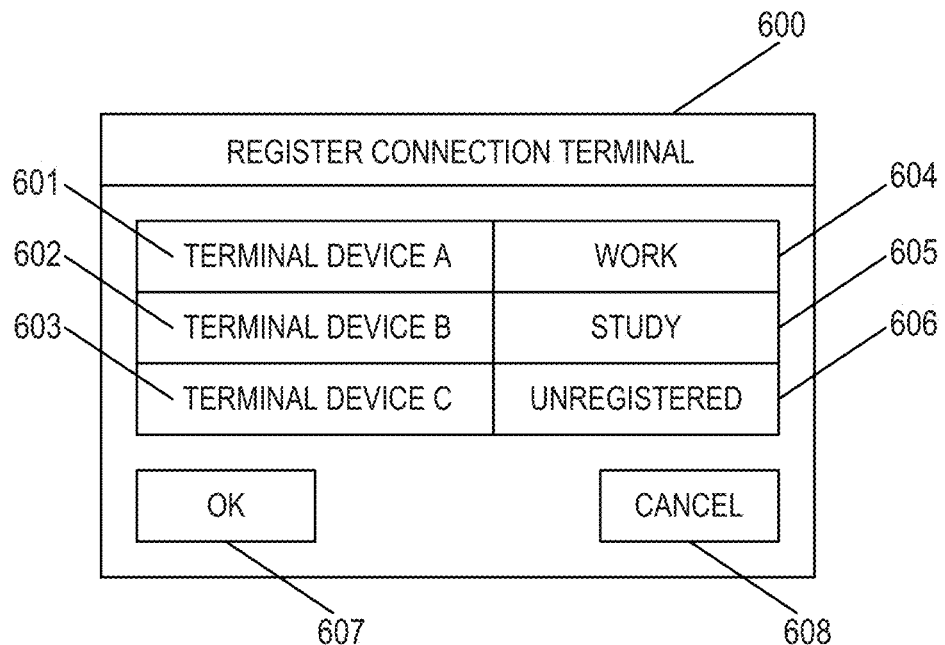
FIG. 6A is a diagram showing an example of a connection terminal registration screen displayed on the operation panel.

FIG. 6A is a diagram showing an example of a connection terminal registration screen displayed on the operation panel.

A connection terminal registration screen 600 displays a list of terminal devices connected to the MFP 100 and the usage scenes associated with the respective terminal devices. This screen is displayed, for example, by selecting a menu corresponding to connection terminal registration from a setting menu (not shown) displayed when the setting button 410 arranged on the standard home screen of FIG. 4 is pressed.

Terminal device information (for example, host name) of the terminal device connected to the MFP 100 via the network 120 is displayed on connection terminals 601, 602 and 603.

For example, a scene 604 "WORK" of the connection terminal 601 "terminal device A" indicates that the terminal device A is associated with a work scene.

A scene 605 "STUDY" of the connection terminal 602 "terminal device B" indicates that the terminal device B is associated with the learning scene.

A scene 606 "unregistered" of the connection terminal 603 "terminal device C" indicates that the terminal device C is connected to the MFP 100 but is not associated with any scene.

An OK button 607 is used to determine the contents of registration based on the contents currently displayed on the connection terminal registration screen 600 and close the screen.

A cancel button 608 is a button for discarding update contents in the connection terminal registration screen 600 and closing this screen.

The connection terminal registration screen 600 is an example of a screen when three terminal devices are connected to the MFP 100. When four or more terminal devices are connected to the MFP 100, all the terminal device information can be visualized on the connection terminal registration screen 600 by scrolling the screen.

Figure 6B:
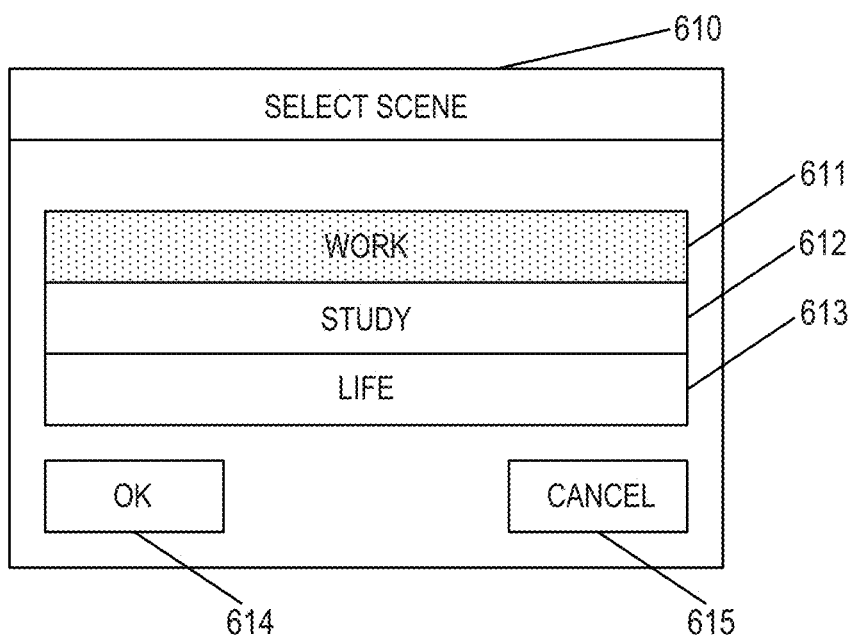
FIG. 6B is a diagram showing an example of a connection terminal registration screen displayed on the operation panel.

FIG. 6B is a diagram showing an example of a scene selection screen displayed on the operation panel.

A scene selection screen 610 is an example of a screen displayed when the usage scene is associated with the terminal device. The scene selection screen 610 is a screen to be switched when one of the terminal devices (the connection terminals 601, 602 and 603) is selected in the connection terminal registration screen 600 shown in FIG. 6A.

WORK 611, STUDY 612 and LIFE 613 indicate work scenes, learning scenes, and life scenes, respectively, and by selecting one of them, it is possible to select the usage scene to be associated with the terminal device selected in the connection terminal registration screen 600. In the connection terminal registration screen 600, when a terminal device that has already been associated with a scene is selected and the screen is shifted to this screen, for example, the background color of the display area is changed as in WORK 611 to indicate the current selection state.

An OK button 614 is a button for determining a scene currently selected on the scene selection screen 610 as a scene associated with the terminal device selected on the connection terminal registration screen 600 and closing the screen. When neither scene is selected, the OK button 614 is disabled.

A cancel button 615 is a button for discarding the changed contents and returning to the connection terminal registration screen 600.

<Connection Terminal Information Registration Flow>

Figure 7:
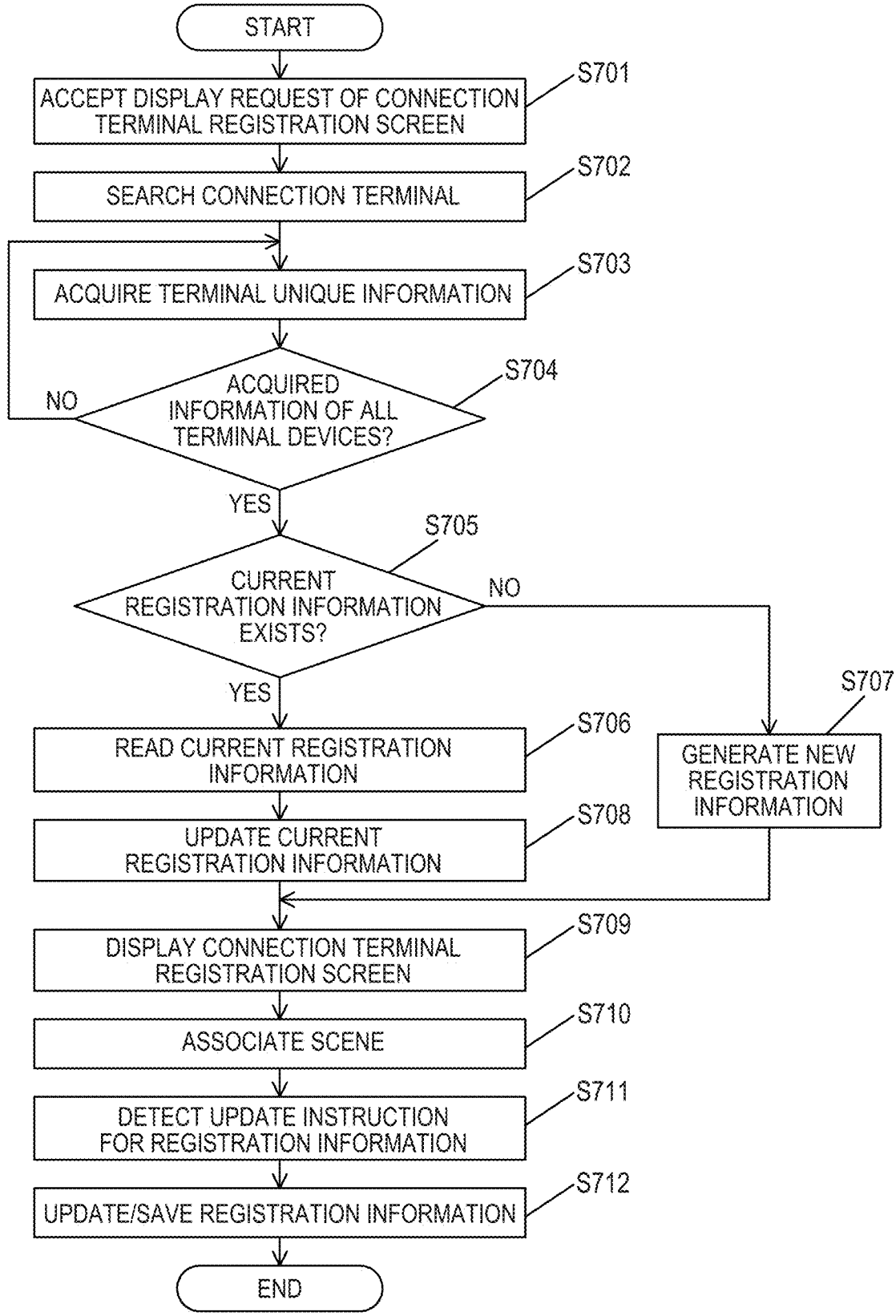
FIG. 7 is a flowchart showing processing for associating a terminal device with a scene.

FIG. 7 is a flowchart showing processing for associating a terminal device with a scene. The CPU 101 of the MFP 100 reads out and executes a program stored in the ROM 102 or the like to realize the processing of this flowchart. In the figure, "S" denotes a step.

In step S701, when the operation display unit 108 receives an operation for opening the connection terminal registration screen 600, the CPU 101 advances the processing to step S702. The process of the flowchart starts on the basis that the operation display unit 108 has accepted an operation for opening the connection terminal registration screen 600 (S701).

In step S702, the CPU 101 performs broadcast transmission via the communication control unit 110 in response to the operation (screen display request) received in step S701, and searches for a connection terminal.

Next, in step S703, the CPU 101 acquires unique information by unicast with respect to one of the terminal devices which has not been processed among the terminal devices responding to the broadcast transmission performed in step S702.

Next, in step S704, the CPU 101 determines whether or not the acquisition of the unique information has been performed for all the terminal devices responding to the broadcast transmission in step S703.

When it is determined that there is a terminal device which has not acquired the unique information yet (NO in step S704), the CPU 101 returns the processing to step S703.

On the other hand, when it is determined that the unique information of all the terminal devices has been acquired (YES in step S704), the CPU 101 advances the processing to step S705.

The CPU 101 stores the connection terminal information obtained in steps S702 to S704 in the RAM 103 at any time, and generates a list of the connection terminal information. An example of this list of connection terminal information is shown in the list of terminal devices in Table 2.

TABLE 2

| List of Terminal Devices | | |
|---|---|---|
| MAC address | IP address | Host name |
| 11-11-11-11-11-11 | 11.22.33.001 | terminal device A |
| 22-22-22-22-22-22 | 11.22.33.002 | terminal device B |
| 33-33-33-33-33-33 | 11.22.33.003 | terminal device C |

The CPU 101 stores a MAC address as information for uniquely identifying the terminal device, a host name as information (601, 602, 603) for displaying on the operation panel of the MFP 100, and the like in the RAM 103.

In step S705, the CPU 101 determines whether the registration information of the connection terminal is already stored in the non-volatile memory 118 (i.e., whether the current registration information exists).

Here, when it is determined that the registration information is not stored (that is, there is no current registration information) (NO in step S705), the CPU 101 advances the processing to step S707.

In step S707, the CPU 101 newly generates registration information of the connection terminal in the RAM 103. When the user opens the connection terminal registration screen 600 for the first time, the current registration information is not yet stored in the non-volatile memory 118. Therefore, the CPU 101 generates new registration information in the RAM 103 based on the connection terminal information obtained in steps S702 to S704. In this case, the registration information is generated in a state in which the usage scenes for all the terminal devices are not registered. After the processing in step S707, the CPU 101 advances the processing to step S709.

On the other hand, when it is determined in step S705 that the registration information is already stored (i.e., the current registration information is present) (YES in step S705), the CPU 101 advances the processing to step S706.

In step S706, the CPU 101 reads the current registration information stored in the non-volatile memory 118 and temporarily develops the current registration information in the RAM 103. An example of this registration information is shown in the list 1 of registration information in Table 3.

TABLE 3

List 1 of Registration Information

| MAC address | IP address | Host Name | Scene |
|---|---|---|---|
| 11-11-11-11-11-11 | 11.22.33.009 | terminal device A | work |
| 22-22-22-22-22-22 | 11.22.33.002 | terminal device B | unregistered |

In step S708, the CPU 101 compares the terminal device list (Table 2) stored in the RAM 103 with the registration information list 1 (Table 3) to update the registration information. At this time, the CPU 101 compares the terminal devices on the basis of the uniquely identifiable MAC address, and updates an information attached to the MAC address if there is any change. In this example, since the IP addresses of the terminal devices having the MAC address "11-11-11-11-11-11" are different, the registration information list 1 is updated with the IP address "11.22.33.001" obtained in S702 to S704. Further, since "terminal device C" exists in the terminal device list (Table 2) but "terminal device C" does not exist in the current registration information list 1 (Table 3), the information of the terminal device C obtained in S702 to S704 is added to the registration information list 1 (Table 3). At the time of the addition, since the terminal device and the usage scene are not associated with each other, the column of the usage scene is not registered in the terminal device C. The registration information after updating in step S708 is as shown in the list 2 of registration information in Table 4. After the processing in step S708, the CPU 101 advances the processing to step S709.

TABLE 4

List 2 of Registration Information

| MAC address | IP address | Host Name | Scene |
|---|---|---|---|
| 11-11-11-11-11-11 | 11.22.33.001 | terminal device A | work |
| 22-22-22-22-22-22 | 11.22.33.002 | terminal device B | unregistered |
| 33-33-33-33-33-33 | 11.22.33.003 | terminal device C | unregistered |

In step S709, the CPU 101 forms the connection terminal registration screen 600 based on the registration information updated in step S708 or the registration information newly generated in step S707, and displays the connection terminal registration screen 600 on the operation panel. However, at this point, the scene 605 of the connection terminal 602 "terminal device B" is in an unregistered state. Hereinafter, in the description of this flowchart, the registration information list 2 (Table 4) is used as the registration information stored in the RAM 103.

In step S710, the CPU 101 updates the registration information list 2 (Table 4) in the RAM 103 in response to the detection of the scene association operation of the user by the operation display unit 108. The scene association operation is an operation in which the user sets a usage scene for each terminal device from the connection terminal registration screen 600 through the scene selection screen 610. For example, when a scene display column (scene 605) of the connection terminal 602 "terminal device B" is pressed, the screen transitions to the scene selection screen 610. Although the screen example 600 shows a state in which a scene is already associated with the "terminal device B", it is assumed that the registration information list 2 (Table 4) is an unregistered state at the present time. The user selects STUDY (612) of the scene selection screen 610 and presses the OK button 614. Then, when the operation display unit 108 detects that the OK button 614 is pressed, the CPU 101 updates the registration information list 2 (Table 4) of the RAM 103 and displays it on the operation display unit 108. The updated state is as shown in the list 3 of registration information in Table 5.

TABLE 5

List 3 of Registration Information

| MAC address | IP address | Host Name | Scene |
|---|---|---|---|
| 11-11-11-11-11-11 | 11.22.33.001 | terminal device A | work |
| 22-22-22-22-22-22 | 11.22.33.002 | terminal device B | learning |
| 33-33-33-33-33-33 | 11.22.33.003 | terminal device C | unregistered |

In step S711, when the CPU 101 detects that the OK button 607 of the connection terminal registration screen 600 is pressed, the CPU 101 advances the processing to step S712.

In step S712, the CPU 101 updates and stores the current registration information (the same contents as the registration information list 1 (Table 3) at this time) of the non-volatile memory 118 with the contents of the registration information list 3 (Table 5) of the RAM 103 in response to the detection of the depression of the OK button in step S711.

<Home Screen and Main Body Setting Values Switching Flow>

Figure 8:
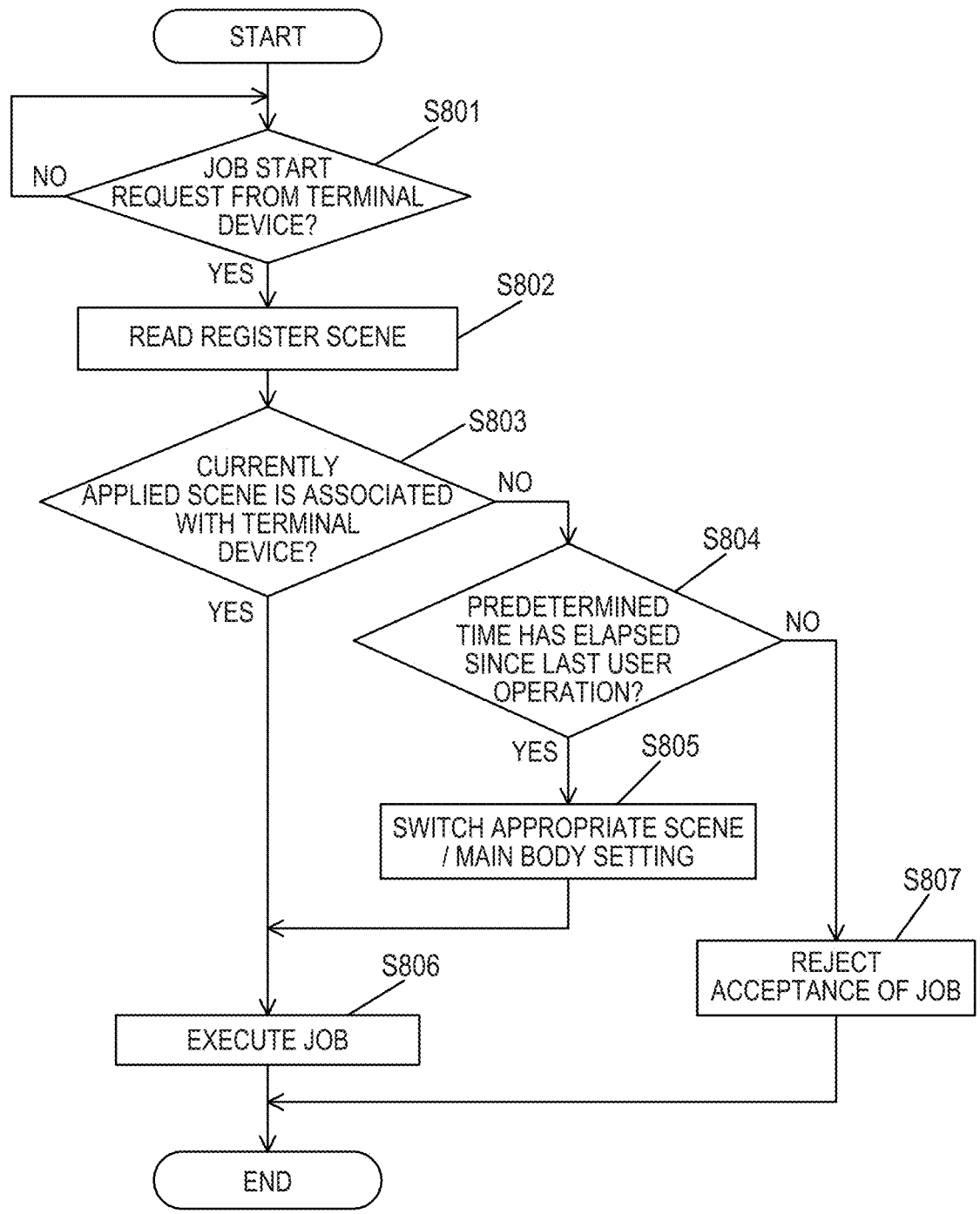
FIG. 8 is a flowchart showing processing when a scene is switched by access from a terminal device.

FIG. 8 is a flowchart showing processing for switching a scene by access from a terminal device. The CPU 101 of the MFP 100 reads out and executes a program stored in the ROM 102 or the like to realize the processing of this flowchart. In the figure, "S" denotes a step. The processing of this flowchart is started based on the fact that the communication control unit 110 receives a job start request from the terminal device (YES in step S801).

In step S801, when the communication control unit 110 receives a job start request from the terminal device (YES in step S801), that is, when receiving a job, the CPU 101 advances the processing to step S802. At this time, the MAC address of the requesting terminal device is required. When the MAC address of the request source terminal device cannot be acquired at the time of receiving the job start request, the CPU 101 may inquire about the MAC address of the request source terminal device. The CPU 101 temporarily stores the MAC address and the IP address of the request source terminal device in the RAM 103 in response to reception of the job start request.

In step S802, the CPU 101 refers to the current registration information stored in the non-volatile memory 118 based on the MAC address of the terminal device acquired in step S801, and reads the scene information associated with the requesting terminal device.

In step S803, the CPU 101 determines whether the scene information read in step S802 matches the currently applied scene.

For example, assume that the main body setting table (Table 1) and the registration information list 3 (Table 5) are stored in the non-volatile memory 118 of the MFP 100, and the currently applied scene is a "learning scene". When a job start request is received from the "terminal device A", it is understood from the registration information list 3 that the corresponding scene of the "terminal device A" is a "work scene". Therefore, in this case, it is determined that the usage scene is different (not matched) from the learning scene currently applied to the MFP 100.

When a job start request is received from the terminal device B, the corresponding scene "learning scene" of the terminal device B matches the "learning scene" currently applied to the MFP 100.

Therefore, in this case, it is determined that the usage scene matches the learning scene currently applied to the MFP 100.

When it is determined in step S803 that the scene information read in step S802 matches the currently applied scene (YES in step S803), the CPU 101 advances the processing to step S806.

In step S806, the CPU 101 issues an instruction to the reading unit 107 or the storage unit 114 to execute a job from the terminal device.

On the other hand, when it is determined in step S803 that the scene information read in step S802 does not match the currently applied scene (NO in step S803), the CPU 101 advances the processing to step S804.

In step S804, the CPU 101 determines whether or not a predetermined time has elapsed since the operation display unit 108 receives the last operation by the user. The predetermined time may be a fixed time as the MFP 100, or may be a time that can be set and changed by the user. The predetermined time may be, for example, a relatively short time of about 10 seconds. It should be noted that it is determined that a predetermined time has elapsed even when no user operation has been accepted after the main power supply of the MFP 100 is turned on. The process of this step is a process for suppressing the occurrence of scene switching due to access from the terminal device while the user operates the operation panel.

When it is determined in step S804 that a predetermined time has elapsed since the operation display unit 108 has accepted the last operation by the user (YES in step S804), the CPU 101 advances the processing to step S805.

In step S805, the CPU 101 displays the custom home screen of the scene associated with the request source terminal, and applies the body setting values associated with the scene to the MFP 100. For example, when the request source is the "terminal device A", since the corresponding scene is the "work scene", the CPU 101 displays the custom home screen of FIG. 5A and applies the setting value corresponding to the work scene in the main body setting table. When an access is made from a terminal device in which a scene is not registered, the CPU 101 displays the standard home screen shown in FIG. 4, and applies standard body setting values.

After the processing in step S805, the CPU 101 advances the processing to step S806 to execute the job.

After execution of the job, the settings (display of the custom home screen according to the scene and the main body setting values) applied in step S805 are maintained, and the user can continuously use the MFP 100 with this setting. After a certain period of time has elapsed, the standard setting (standard home screen display and main body setting values) may be switched.

On the other hand, when it is determined that the predetermined time has not elapsed since the operation display unit 108 has accepted the last operation by the user (NO in step S804), the CPU 101 advances the processing to step S807.

In step S807, the CPU 101 rejects the job without receiving the job, and notifies the request source terminal device that the job has been rejected (canceled) via the communication control unit 110. In other words, the settings are not switched in accordance with the usage scene, and the control of not executing the job is executed. An icon indicating an error or a message indicating an error may be displayed as a notification indicating rejection (cancel) of job acceptance to the request source terminal device (not shown).

According to the above-described processing, it is possible to switch the usage scene by access from the terminal device while preventing sudden switching of the home screen and the main body setting values while the user operates the operation panel of the MFP 100. For example, when a job is executed from a terminal device for work, the user wishes to operate with a main body setting suitable for work, but it is troublesome for the user to change settings from the operation panel of the MFP 100 or to switch a scene. According to the present embodiment, automatic switching becomes possible, and this issue is solved.

In addition, even in a case where a job is continuously copied by the MFP 100 after the job is executed in a desired scene from the terminal device, it is not necessary for the user to change the scene from the operation panel, and convenience is improved.

<Scene Switching Reduction Flow>

Figure 9:
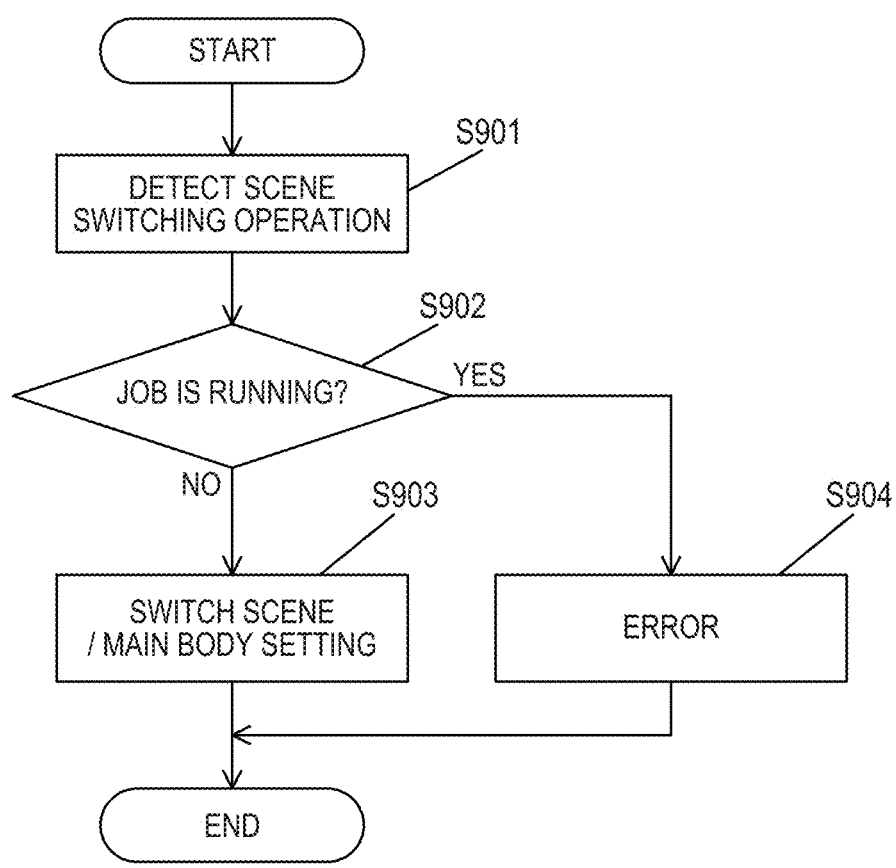
FIG. 9 is a flowchart showing processing for switching a home screen during job execution.

FIG. 9 is a flowchart showing processing for switching a home screen during job execution. The CPU 101 of the MFP 100 reads out and executes a program stored in the ROM 102 or the like to realize the processing of this flowchart. In the figure, "S" denotes a step.

When the operation display unit 108 detects the scene switching operation in step S901, the CPU 101 advances the processing to step S902 in response to the detection. Note that the scene switching operation means that the user presses any one of the tab 1 (402), the tab 2 (403) and the tab 3 (404) on a home screen 400. The processing of this flowchart is started based on the detection of the scene switching operation by the operation display unit 108 (S901).

In step S902, the CPU 101 checks whether any job is currently being executed. When there is no job being executed (NO in step S902), the CPU 101 advances the processing to step S903.

In step S903, the CPU 101 receives the scene switching operation detected by the operation display unit 108, switches to the home screen of the scene corresponding to the pressed tabs (401 to 404), and also switches the main body setting values.

On the other hand, when there is a job being executed (YES in step S902), the CPU 101 advances the processing to step S904.

In step S904, the CPU 101 does not accept the scene switching operation detected by the operation display unit 108, and displays a message indicating that an error indicating that the current scene switching cannot be performed has occurred on the operation panel.

By the above processing, when a user is executing a job with the MFP 100 from the operation panel or the terminal device, that is, when the MFP 100 is used with the main body setting according to the desired scene, it is possible to suppress unintentional scene switching by the operation of another user.

As described above, in the present embodiment, the CPU of the image forming apparatus executes the software (program) to store the scene held by the image forming apparatus and the terminal apparatus information in association with each other.

By managing this association, it becomes possible to switch to an appropriate scene in accordance with access from the associated terminal device, and to switch the corresponding custom home screen and main body setting, thereby improving convenience. Therefore, the scene can be switched more easily, and the convenience of using the image forming apparatus from the external terminal device can be greatly improved. That is, usability can be improved.

Second Embodiment

In the first embodiment, the configuration has been described in which the scene is switched in response to a tab being switched by the operation panel or a job being received from the terminal device. When a predetermined operation such as setting a print sheet or setting documents for reading is performed on the MFP 100, the convenience is further improved if the scene can be appropriately switched. In the present embodiment, a configuration that enables appropriate scene switching in response to the above-described operation will be described.

<Second Home Screen and Main Body Setting Values Switching Flow>

Figure 10:
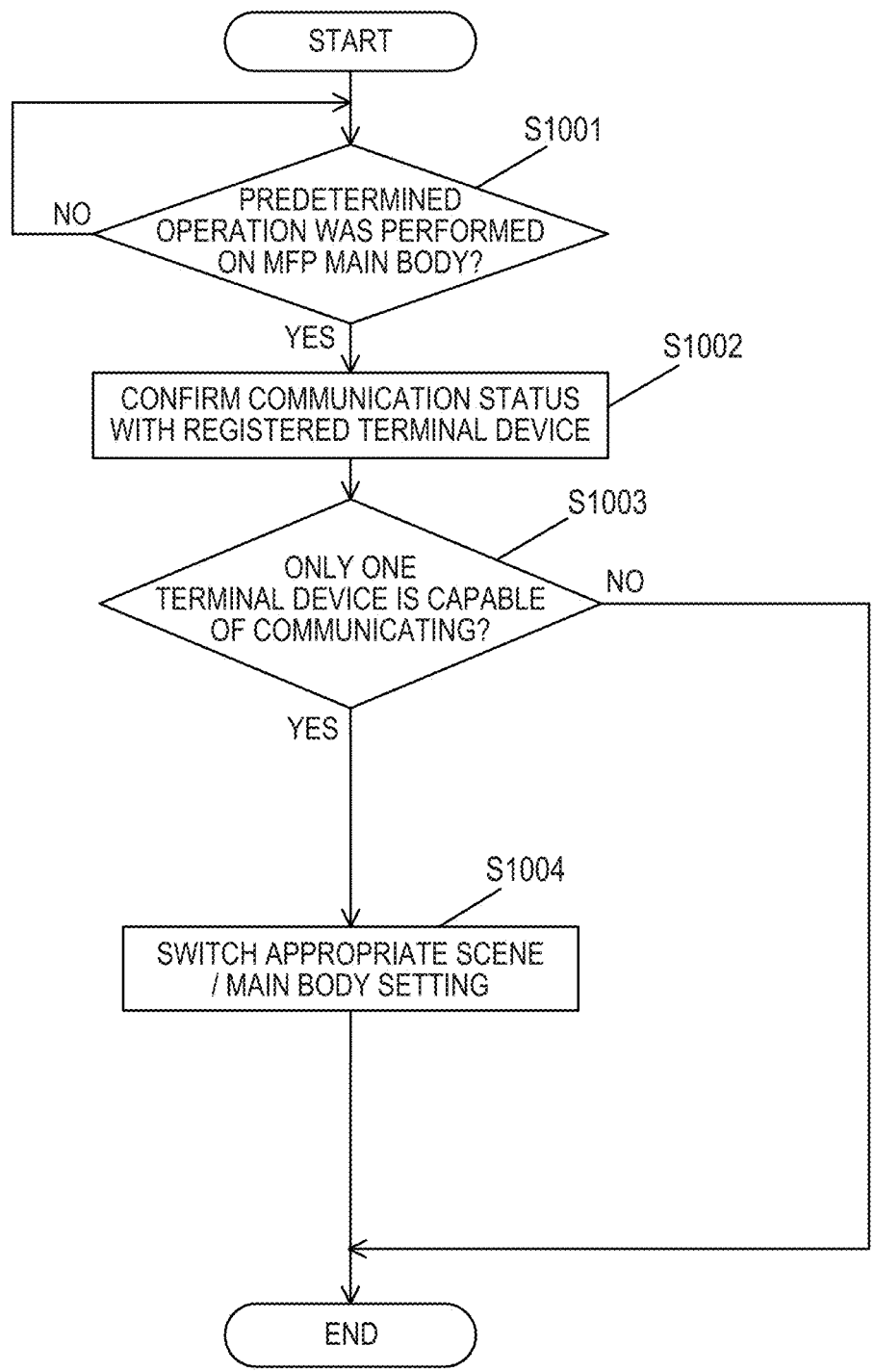
FIG. 10 is a flowchart showing processing for switching a scene according to the second embodiment.

FIG. 10 is a flowchart showing processing for switching a scene according to the second embodiment. The CPU 101 of the MFP 100 reads out and executes a program stored in the ROM 102 or the like to realize the processing of this flowchart. In the figure, "S" denotes a step.

In step S1001, when the CPU 101 detects that a predetermined operation such as an operation for setting a print sheet or an operation for setting documents for reading has been performed by a sensor (not shown), the CPU 101 advances the processing to step S1002. The processing of this flowchart is started based on detection that the CPU 101 has performed a predetermined operation (YES in step S1001).

The operation for setting the print sheet includes, for example, opening and closing of a sheet feeding cassette and a sheet feeding tray (not shown), and setting of sheets in the sheet feeding cassette and the sheet feeding tray. The operation for setting the documents for reading includes, for example, opening and closing a table cover (not shown) and setting the document on the table.

In step S1002, the CPU 101 confirms whether communication with the MFP 100 is possible for each terminal device registered in association with the scene, as in the registration information in Table 5.

In step S1003, the CPU 101 determines whether there is only one terminal device capable of communicating. When it is determined that there is only one terminal device capable of communicating (YES in step S1003), the CPU 101 advances the processing to step S1004.

In step S1004, the CPU 101 switches the settings according to the scene associated with the information of the terminal device confirmed to be communicable in step S1002. That is, the CPU 101 displays the custom home screen of a scene associated with the communicable terminal device, and applies the body setting values associated with the scene to the MFP 100.

On the other hand, when it is determined that there is no or a plurality of communication-enabled terminal devices (NO in step S1003), the CPU 101 ends the processing of this flowchart without switching the scene.

As described above, when a predetermined operation is performed and only one terminal device among the terminal devices registered in association with the scene can communicate with the MFP 100, the possibility that the MFP 100 is used from the terminal device is extremely high. Therefore, by switching to a scene associated with the terminal device, convenience is improved.

On the other hand, when there is no terminal device capable of communicating with the MFP 100, or when there are a plurality of terminal devices capable of communicating with the MFP 100, since it is impossible to identify a terminal device having a high possibility of using the MFP 100, scene switching is not performed. Even when there are a plurality of terminal devices capable of communicating with the MFP 100 described above, if the plurality of terminal devices are associated with the same scene, since a scene with a high possibility of being used can be specified as one scene, the scene may be switched to the scene.

As described above, even when a predetermined operation for using the MFP, such as a set of print sheets or a set of documents for reading, is performed, the scene can be appropriately switched, and the convenience of the user can be further improved.

In the above embodiment, the configuration in which the terminal device is registered by searching the network has been described, but the terminal device may be registered by manually inputting an IP address or the like from the operation panel.

Further, the MFP 100 and the terminal device 130 are not limited to being connected by a network, but may be connected by another communication method such as NFC or Bluetooth (registered trademark).

As described above, when a job is received from the terminal device, the setting (mode) corresponding to the usage scene registered in association with the information of the terminal device is switched. That is, by switching the mode setting of the multi-use printer or the like by the connection terminal, the convenience of using the image forming apparatus from the external terminal device can be greatly improved.

It is to be noted that the configuration and contents of the above-described various data are not limited thereto, and it is needless to say that the various data are configured in various configurations and contents depending on the application and purpose.

Although an embodiment of the present disclosure has been described above, embodiments of the present disclosure can be implemented as, for example, a system, an apparatus, a method, a program, or a storage medium. Specifically, embodiments of the present disclosure may be applied to a system including a plurality of devices, or may be applied to an apparatus including a single device.

Embodiments of the present disclosure include all configurations obtained by combining the above-described embodiments.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-194685, filed Dec. 6, 2022, which is hereby incorporated by reference herein in its entirety.

What is claimed is:

1. An image forming apparatus capable of switching settings based on a usage scene, the image forming apparatus comprising:
   one or more processors; and
   at least one memory storing executable instructions, which when executed by the one or more processors, cause the image forming apparatus to perform operations comprising:
      registering information of a terminal device and the usage scene in association with each other; and
      controlling switching a setting corresponding to the usage scene registered in association with the information of the terminal device in a case where a job is received from the terminal device,
   wherein in a case where a predetermined operation is performed on the image forming apparatus and only one terminal device communicable with the image forming apparatus exists among the terminal devices registered in association with the usage scene, the controlling switches a setting to the setting corresponding to the usage scene associated with the information of the terminal device, and
   wherein in the case where the predetermined operation is performed on the image forming apparatus and in a case where a plurality of terminal devices communicable with the image forming apparatus exist among the terminal devices registered in association with the usage scene and the plurality of terminal devices are associated with the same usage scene, the controlling switches a setting to the setting corresponding to the usage scene.

2. The image forming apparatus according to claim 1, wherein the setting corresponding to the usage scene includes a setting of an operation screen in which an operation menu is arranged based on the usage scene, and
   wherein the switching of the setting corresponding to the usage scene includes switching display of the operation screen corresponding to the usage scene.

3. The image forming apparatus according to claim 1, wherein in a case where a predetermined period of time has not elapsed since an operation unit of the image forming apparatus is operated when the job is received from the terminal device, the controlling does not switch the setting corresponding to the usage scene and executes control not to execute the job.

4. The image forming apparatus according to claim 1, wherein the image forming apparatus is capable of switching the usage scene by an operation from an operation unit of the image forming apparatus, and
   wherein in a case where the image forming apparatus is executing the job, the controlling executes control not to accept switching of the usage scene from the operation unit.

5. The image forming apparatus according to claim 1, wherein the predetermined operation includes at least one of an operation of setting a print sheet and an operation of setting documents for reading.

6. A control method of an image forming apparatus capable of switching settings based on a usage scene, the control method comprising:
   registering information of a terminal device and the usage scene in association with each other; and
   switching to a setting corresponding to the usage scene registered in association with the information of the terminal device in a case where a job is received from the terminal device,
   wherein in a case where a predetermined operation is performed on the image forming apparatus and only one terminal device communicable with the image forming apparatus exists among the terminal devices registered in association with the usage scene, the switching switches a setting to the setting corresponding to the usage scene associated with the information of the terminal device, and
   wherein in the case where the predetermined operation is performed on the image forming apparatus and in a case where a plurality of terminal devices communicable with the image forming apparatus exist among the terminal devices registered in association with the usage scene and the plurality of terminal devices are associated with the same usage scene, the switching switches a setting to the setting corresponding to the usage scene.

7. The control method according to claim 6,
wherein the setting corresponding to the usage scene includes a setting of an operation screen in which an operation menu is arranged based on the usage scene, and
wherein the switching of the setting corresponding to the usage scene includes switching display of the operation screen corresponding to the usage scene.

8. The control method according to claim 6, wherein in a case where a predetermined period of time has not elapsed since an operation unit of the image forming apparatus is operated when the job is received from the terminal device, the switching does not switch the setting corresponding to the usage scene and executes control not to execute the job.

9. The control method according to claim 6,
wherein the image forming apparatus is capable of switching the usage scene by an operation from an operation unit of the image forming apparatus, and
wherein in a case where the image forming apparatus is executing the job, the switching executes control not to accept switching of the usage scene from the operation unit.

10. The control method according to claim 6, wherein the predetermined operation includes at least one of an operation of setting a print sheet and an operation of setting documents for reading.

11. A non-transitory computer-readable storage medium storing a program including executable instructions, which when executed by one or more processors of an image forming apparatus, cause the image forming apparatus to perform operations comprising:
registering information of a terminal device and the usage scene in association with each other; and
switching to a setting corresponding to the usage scene registered in association with the information of the terminal device in a case where a job is received from the terminal device,
wherein in a case where a predetermined operation is performed on the image forming apparatus and only one terminal device communicable with the image forming apparatus exists among the terminal devices registered in association with the usage scene, the switching switches a setting to the setting corresponding to the usage scene associated with the information of the terminal device, and
wherein in the case where the predetermined operation is performed on the image forming apparatus and in a case where a plurality of terminal devices communicable with the image forming apparatus exist among the terminal devices registered in association with the usage scene and the plurality of terminal devices are associated with the same usage scene, the switching switches a setting to the setting corresponding to the usage scene.

* * * * *